US008990448B2

(12) United States Patent
Yendigiri et al.

(10) Patent No.: US 8,990,448 B2
(45) Date of Patent: Mar. 24, 2015

(54) SMART DISCOVERY MODEL IN A SERIAL ATTACHED SMALL COMPUTER SYSTEM TOPOLOGY

(71) Applicant: LSI Corporation, San Jose, CA (US)

(72) Inventors: Prashant Prakash Yendigiri, Bangalore (IN); Raghavendra Channagiri Nagendra, Bangalore (IN); Giridhar Danayakanakeri, Bangalore (IN)

(73) Assignee: LSI Corporation, Milpitas, CA (US)

( * ) Notice: Subject to any disclaimer, the term of this patent is extended or adjusted under 35 U.S.C. 154(b) by 45 days.

(21) Appl. No.: 13/790,488

(22) Filed: Mar. 8, 2013

(65) Prior Publication Data

US 2014/0258565 A1    Sep. 11, 2014

(51) Int. Cl.
*G06F 3/00* (2006.01)
*G06F 5/00* (2006.01)
*G06F 11/30* (2006.01)

(52) U.S. Cl.
CPC .................................. *G06F 11/3055* (2013.01)
USPC .......... 710/17; 710/8; 710/10; 710/19; 710/46

(58) Field of Classification Search
None
See application file for complete search history.

(56) References Cited

U.S. PATENT DOCUMENTS

| 7,523,233 | B1 | 4/2009 | Klein et al. | |
| 7,849,248 | B2 * | 12/2010 | Johnson et al. | 710/300 |
| 8,051,436 | B2 * | 11/2011 | Jones | 719/326 |
| 8,077,605 | B2 | 12/2011 | McCarty et al. | |
| 8,200,872 | B2 | 6/2012 | Johnson et al. | |
| 2007/0073909 | A1 | 3/2007 | Gasser | |
| 2008/0022026 | A1 * | 1/2008 | Yang et al. | 710/200 |
| 2012/0124256 | A1 * | 5/2012 | Johnson et al. | 710/105 |
| 2012/0144082 | A1 | 6/2012 | Romero et al. | |
| 2012/0173840 | A1 | 7/2012 | Patel et al. | |
| 2014/0059256 | A1 * | 2/2014 | Henning et al. | 710/36 |

OTHER PUBLICATIONS

Fairchild, S. "SAS Expander Initiator Based Configuration," HP, Industry Standard Servers, Jul. 12, 2002, 33 pages.

* cited by examiner

*Primary Examiner* — Kris Rhu
(74) *Attorney, Agent, or Firm* — Duft Bornsen & Fettig

(57) ABSTRACT

Methods, systems and processor-readable media are disclosed for implementing a "smart" discovery process in a data transfer regime having one or more expanders and one or more initiators. Data traffic associated with such a discovery process can be reduced and one or more of the initiators can be prevented from blocking input/output to particular components in communication with the data transfer regime, thereby improving and completing the discovery process in an optimal time frame while enhancing the performance of the initiator(s).

20 Claims, 4 Drawing Sheets

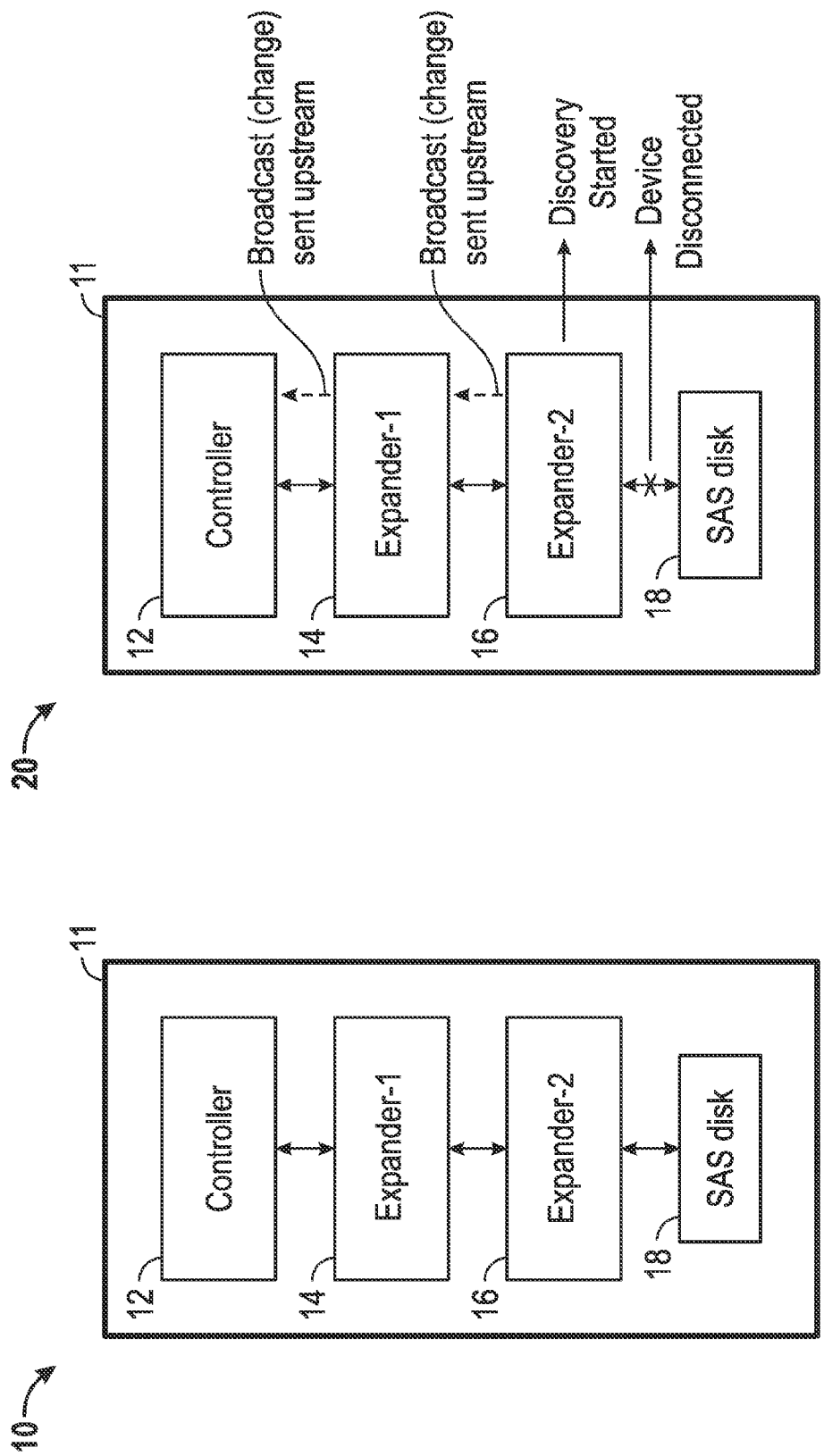

SMART DISCOVERY MODEL IN A SERIAL ATTACHED SMALL COMPUTER SYSTEM TOPOLOGY

FIELD OF THE INVENTION

Embodiments are generally related to storage semiconductors and protocols. Embodiments are also related to discovery and configuration of a data transfer regime such as, for example, Serial Attached SCSI (Small Computer System interface) ("SAS")

BACKGROUND

Serial Attached SCSI (SAS) is a term referring to various technologies designed to implement data transfer between computer devices. The SAS protocol is a serial successor to the parallel Small Computer System Interface. In the SAS protocol, all SAS devices are either an initiator device, a target device, or an expander device. Initiator devices are devices that begin a SAS data transfer, while target devices are the devices to which initiator devices transfer data. Together, initiator devices and target devices are also known in some cases as end devices.

SAS expanders are devices that facilitate data transfer between multiple initiator devices and multiple target devices. The SAS protocol utilizes a point-to-point bus topology. Therefore, if an initiator device is required to connect to multiple target devices, a direct connection must be made between the initiator device and each individual target device in order to facilitate each individual data transfer between the initiator device and each individual target device. SAS expanders manage the connections and data transfer between multiple initiator devices and multiple target devices. SAS expanders may contain SAS devices.

In a typical SAS topology when a device goes missing, all the SAS devices capable of SMP initiator properties connected to the missing device directly or indirectly would start the discovery. After the completion of discovery, the SAS initiator would update its device table to reflect the modified topology. If the SAS topology is huge with tens of expanders and if the device attached to the lowest expander goes missing, then all the expanders from initiator to the expander where the device went missing will start the discovery. This generates a lot of traffic flow in the topology. Also, Discovery is the highest priority task carried out by SAS initiator so all the I/Os to other devices will be stalled till the discovery process is completed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved data transfer regime.

It is another aspect of the disclosed embodiments to provide for an improved discovery process in a data transfer regime such as, for example, a SAS topology.

It is yet another aspect of the disclosed embodiments to provide for an intelligent discovery process with enhanced time savings for controllers associated with a data transfer regime.

It is still another aspect of the disclosed embodiments to provide for an improved fact discovery of missing or added devices in a data transfer regime.

The aforementioned aspects and other objectives and advantages can now be achieved as described herein. Methods, systems and processor-readable media are disclosed for implementing a "smart" discovery process in a data transfer regime having one or more expanders and one or more initiators. Data traffic associated with such a discovery process can be reduced and one or more of the initiators can be prevented from blocking input/output to particular components in communication with the data transfer regime, thereby improving and completing the discovery process in an optimal time frame, while enhancing the performance of the initiator(s).

Utilizing the approach described herein, the traffic generated due to the discovery process can be reduced and the initiator(s) allowed not to block the I/Os to other devices. Such a new technique can improve the discovery process and complete discovery in comparatively less time, and also increases the initiator performance by not blocking the I/Os to other devices.

The disclosed embodiments can save controller time by avoiding performing a rediscovery process of a data transfer regime such as, for example, a SAS topology. A fast/quick discovery process helps to improve the overall performance of various SAS devices in communication with such a SAS topology. Additionally, this approach adds intelligence to the expanders so that the dependency of a controller associated with the SAS topology is over ruled. The expander can also self-manage devices added or removed with respect to the SAS topology. The controller will not block I/Os to other devices except the missing device, thereby increasing and enhance overall system performance. Additionally, comparatively other tasks can have access to processor cycles due to less discovery traffic. Finally, all of the expanders and initiators in the SAS topology path are updated in real time.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a block diagram of a SAS topology;

FIG. 2 illustrates a block diagram of the SAS topology shown in FIG. 1, in which a device has gone missing;

DETAILED DESCRIPTION

Figure 3:
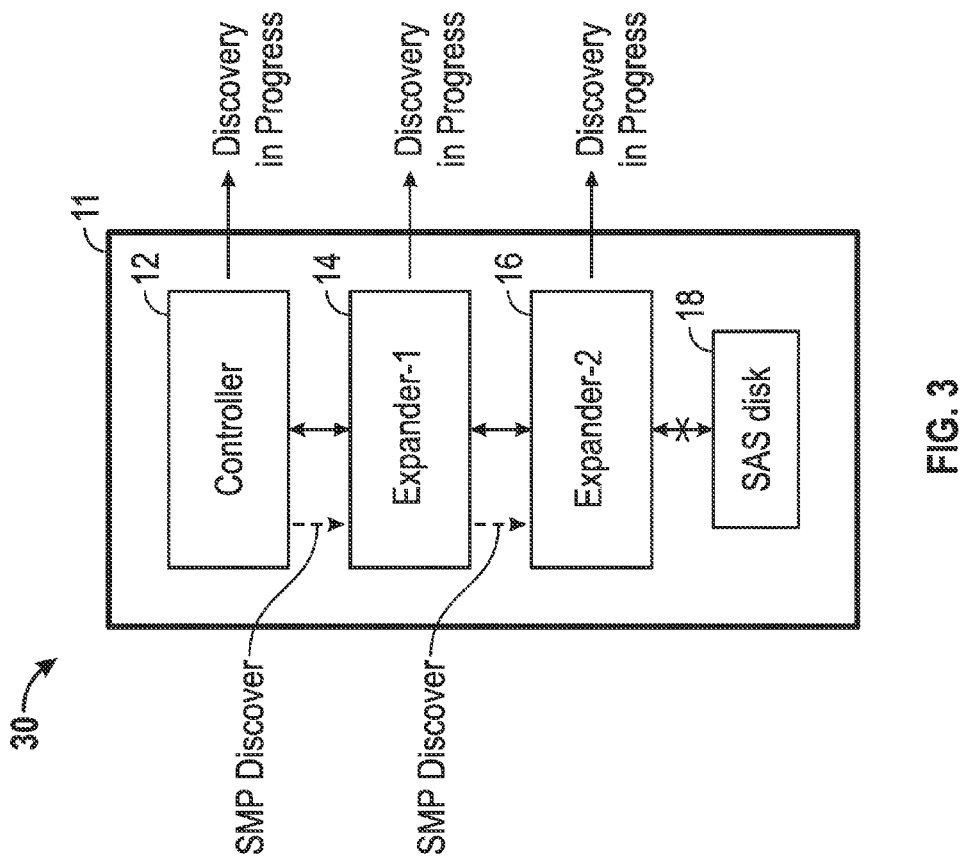
FIG. 3 illustrates a block diagram of the SAS topology shown in FIGS. 1-2, wherein discovery is initiated by an initiator.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Thus, for example, although different embodiments are described with respect to different features and components and varying figures, each figure can relate to the prior figure or next figure as part of an overall description of the present invention. Similarly, similar or identical parts or components may be indicated by the same reference numeral or identifier in different figures.

Figure 4:
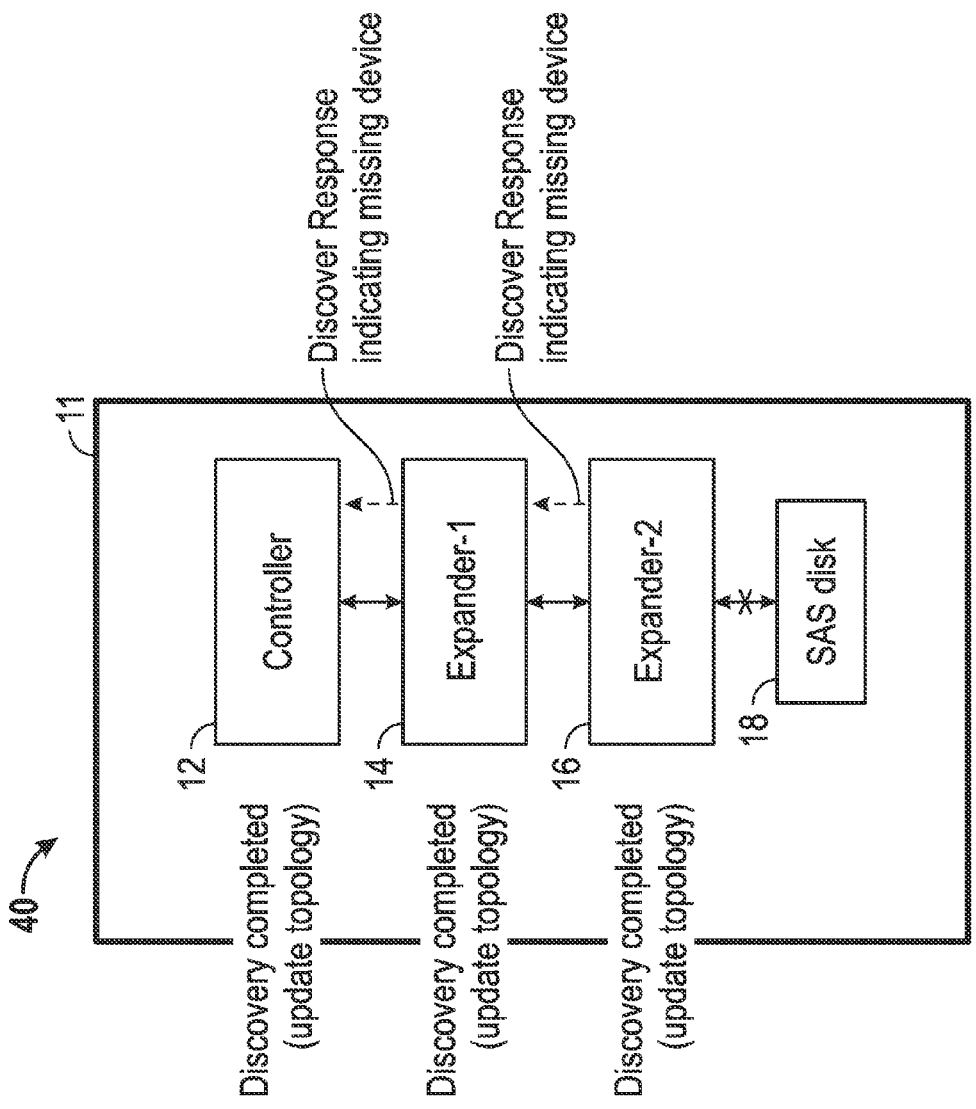
FIG. 4 illustrates a block diagram of the SAS topology depicted in FIGS. 1-3, in which discovery is completed and the SAS topology updated.

Turning now to FIGS. 1-4, respective block diagrams 10, 20, 30, 40 of a data transfer regime such as, for example, a SAS topology 11 and discovery steps thereof are shown, FIG. 2 illustrates a block diagram 20 of the SAS topology 11 shown in FIG. 1, in which a device has gone missing. FIG. 3 illustrates a block diagram 30 of the SAS topology 11 shown in FIGS. 1-2, wherein discovery is initiated by an initiator. FIG. 4 illustrates a block diagram 40 of the SAS topology depicted in FIGS. 1-3, in which discovery is completed and the SAS topology 11 updated. The SAS topology generally includes a controller 12 that communicates with one or more expanders 14 and 16 (also respectively referred to as Expander 1 and Expander 2). Expander 16 (i.e., Expander 2) communicates with the SAS disk 18 and Expander 14 (i.e., Expander 1).

In general, when the SAS disk 18 goes missing (e.g., the device is disconnected as shown in FIG. 3), Expander 2 will receive a notification first as it is the directly attached expander to the SAS disk 18. Expander 2 will send a broadcast (change) to all of its physical layer ("phy") and initiate the discovery process. The expander 1 after receiving the broadcast (change) primitive will send the primitive through all of its phys. Expander 1 initiates discovery of Expander 2. Once SAS initiator receives the broadcast (change) primitive, it too will initiate the discovery process.

Expander 1 and the SAS initiator wait for Expander 2 to complete the discovery. During this period of time, the SAS initiator will block all I/Os targeted through the SAS topology 11, thus stopping any I/O movement. Once Expander 2 finishes discovery, it will send discovery response to Expander 1 with updated topology reflecting removal of SAS disk. Similarly, Expander 1 will update its own device table and send discovery response with updated topology to SAS Initiator. The SAS Initiator will then update its own device table and then resumes I/O transfers.

Expander 1 and the SAS initiator wait for Expander 2 to complete the discovery. During this period of time, the SAS initiator will block all I/Os targeted through the SAS topology 11, thus stopping any I/O movement. Once Expander 2 finishes discovery, it will send discovery response to Expander 1 with updated topology reflecting removal of SAS disk. Similarly, Expander 1 will update its own device table and send discovery response with updated topology to SAS Initiator. The SAS Initiator will then update its own device table and then resumes I/O transfers.

Figure 5:
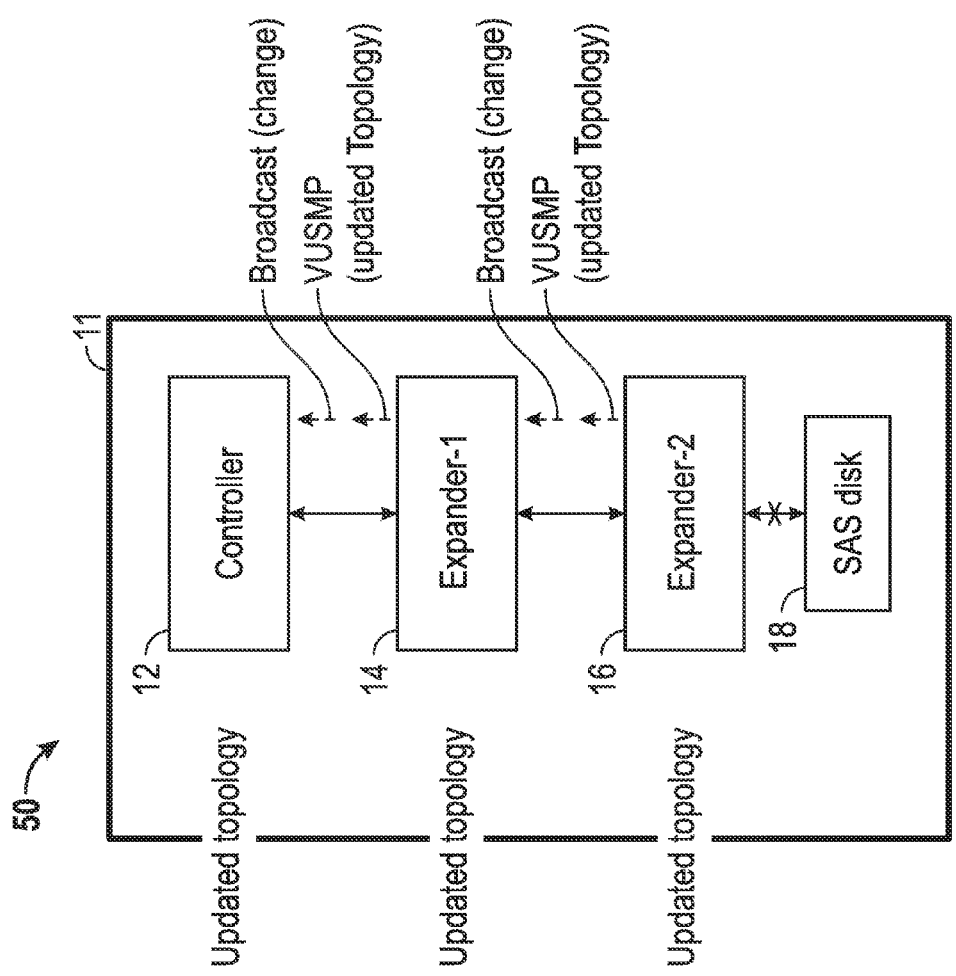
FIG. 5 illustrates a block diagram of a SAS topology, in accordance with a preferred embodiment.

FIG. 5 illustrates a block diagram 50 of the SAS topology 11, in accordance with a preferred embodiment. FIG. 5 serves to explain the same topology update process, but with a new discovery paradigm. Once the SAS disk goes missing, Expander 2 will begin the discovery and updates its own device table at the end of discovery. It then sends out broadcast (change) primitive through all of its phys. This is followed by a vendor unique SMP (VUSMP) frame with updated device topology. Expander 1 receives broadcast (change) and VUSMP (update topology) frames back to back. Expander firmware can be modified such that upon receiving the broadcast (change), if the VUSMP(update topology) is received then FVV should update its device table as per the VUSMP and forward the broadcast (change) followed by VUSMP frames back to back through all of its phys.

The SAS Initiator will receive a both broadcast (change) and a VUSMP. The SAS Initiator FW should also be modified to update the device table if it receives a VUSMP after a broadcast (change). This technique allows a controller to block only I/Os related to missing SAS disk and allow all other I/Os to be transmitted without any delay. This new technique will increase the I/O throughput and also improve discovery process and reduce the time involved in discovery process.

The following details can be sent in VUSMP frame:
1. SAS address of the added or removed device.
2. SAS address of the parent Expander on which #1 occurred.
3. Phy number of the Expander on which #1 occurred.

A "smart" discovery process can thus be implemented in the context of a SAS topology such as SAS topology 11 having one or more expanders 14, 16 and one or more initiators such as SAS disk 18. Data traffic associated with such a discovery process can be reduced and one or more of the initiators can be prevented from blocking input/output to particular components in communication with the SAS topology thereby improving and completing the discovery process in an optimal time frame, while enhancing the performance of the initiator(s).

Utilizing this approach, the traffic generated due to the discovery process can be reduced and the initiator(s) allowed not to block the I/Os to other devices. Such a new technique can improve the discovery process and complete discovery in a comparatively less time and also increases the initiator performance by not blocking the I/Os to other devices.

The disclosed embodiments can save a SAS controller time by avoiding performing rediscover of a SAS topology. A fast/quick discovery process helps to improve the overall performance of various SAS devices in communication with such a SAS topology. Additionally, this approach adds intelligence to the expanders so that the dependency of a controller associated with the SAS topology is over ruled. The expander can also self-manage devices added or removed with respect to the SAS topology. The controller will not block I/Os to other devices except the missing device, thereby increasing and enhancing overall system performance. Additionally, other tasks can have access to processor cycles due to less discovery traffic. Finally, all of the expanders and initiators in the SAS topology path are updated in real time.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for discovery in a data transfer regime, the method comprising:
reducing data traffic associated with discovery of a SAS disk in a data transfer regime having at least one expander and at least one initiator;
preventing the at least one initiator from blocking input/output not related to the SAS disk in communication with the data transfer regime, thereby improving and completing the discovery while enhancing the performance of the at least one initiator; and
configuring an expander associated with the data transfer regime so that a dependence of the expander on an associated controller is over ruled during the discovery of the SAS disk in the data transfer regime.

2. The method of claim 1 wherein:
reducing data traffic associated with the discovery comprises generating, via at least one expander associated with the data transfer regime, a vendor unique Serial Management Protocol (SMP) frame that indicates an updated device topology.

3. The method of claim 1 further comprising configuring the at least one expander to self-manage SAS disks being added or removed with respect to the data transfer regime.

4. The method of claim 1 further comprising automatically updating the at least one expander and the at least one initiator associated with the data transfer regime in real time.

5. The method of claim 1 wherein the data transfer regime comprises a SAS topology.

6. The method of claim 5 further comprising configuring the SAS topology to include the SAS disk that communicates with the at least one expander.

7. The method of claim 5 further comprising configuring the SAS topology to include a SAS initiator that updates a device table in response to receipt of a frame.

8. The method of claim 7 providing at least one of the following in the frame:
a SAS address of a SAS disk added or removed with respect to the SAS topology;
a SAS address of the at least one expander; and
a physical layer of the at least one expander.

9. A system for discovery in a data transfer regime, said the system comprising:
a data transfer regime having at least one expander and at least one initiator, wherein data traffic associated with discovery of an SAS disk in the data transfer regime is reduced;
at least one initiator that is prevented from blocking input/output not related to the SAS disk in communication with said data transfer regime, thereby improving and completing the discovery while enhancing the performance of the at least one initiator; and
a controller, wherein an expander associated with the data transfer regime is configured such that a dependence of the expander on the controller is over ruled during the discovery of the SAS disk in the data transfer regime.

10. The system of claim 9 wherein at least one expander associated with the data transfer regime is operable to reduce data traffic associated with the discovery by generating a vendor unique Serial Management Protocol (SMP) frame that indicates an updated device topology.

11. The system of claim 9 wherein said at least one expander is configured to self-manage SAS disks being added or removed with respect to the data transfer regime.

12. The system of claim 9 wherein the at least one expander and the at least one initiator associated with the data transfer regime are automatically updated in real time.

13. The system of claim 9 wherein the data transfer regime comprises a SAS topology.

14. The system of claim 13 wherein the SAS topology includes the SAS disk that communicates with the at least one expander.

15. The system of claim 13 wherein the SAS topology includes a SAS initiator that updates a device table in response to receipt of a frame.

16. The system of claim 15 further comprising at least one of the following in the frame:
a SAS address of a SAS disk added or removed with respect to the SAS topology;
a SAS address of the at least one expander; and
a physical layer of the at least one expander.

17. A system for discovery in a SAS topology, the system comprising:
a SAS topology having at least one expander and at least one initiator, wherein data traffic associated with discovery of a SAS disk in the data transfer regime is reduced;
at least one initiator that is prevented from blocking input/output not associated with the SAS disk in communication with the SAS topology thereby improving and completing the discovery while enhancing the performance of said at least one initiator; and
a controller, wherein the at least one expander of the SAS topology is configured such that a dependence of the at least one expander on the controller is over ruled during the discovery of the SAS disk in the SAS topology.

18. The system of claim 17 wherein the SAS topology includes the SAS disk that communicates with the at least one expander.

19. The system of claim 17 wherein the SAS topology includes a SAS initiator that updates a device table in response to receipt of a frame.

20. The system of claim 19 further comprising at least one of the following in the frame:
a SAS address of a SAS disk added or removed with respect to the SAS topology;
a SAS address of the at least one expander; and
a physical layer of the at least one expander.

* * * * *